United States Patent [19]

Marrison et al.

[11] Patent Number: 5,145,213
[45] Date of Patent: Sep. 8, 1992

[54] FRANGIBLE FITTING ASSEMBLY

[75] Inventors: William C. Marrison, Jackson; Russell L. Rogers, Munith, both of Mich.

[73] Assignee: Aeroquip Corporation, Jackson, Mich.

[21] Appl. No.: 620,964

[22] Filed: Nov. 30, 1990

[51] Int. Cl.⁵ .............................................. F16L 35/00
[52] U.S. Cl. .................................... 285/2; 285/3; 285/4; 285/304; 403/2
[58] Field of Search ................. 285/2, 3, 1, 304, 4; 137/68.1; 403/2, 309, 299; 222/541

[56] References Cited

U.S. PATENT DOCUMENTS

| | | | |
|---|---|---|---|
| 3,719,194 | 3/1973 | Anderson et al. | 137/68.1 |
| 4,090,524 | 5/1978 | Allread et al. | 285/2 X |
| 4,643,216 | 2/1987 | Allread et al. | 285/2 X |
| 4,884,591 | 12/1989 | Webster | 137/68.1 |
| 4,898,199 | 2/1990 | Morris et al. | 285/2 X |

FOREIGN PATENT DOCUMENTS 814290  6/1969  Canada ................................ 285/2

Primary Examiner—Randolph A. Reese
Assistant Examiner—Timothy Aberle

[57] ABSTRACT

A frangible fluid conduit fitting particularly suitable for servicing aircraft wherein the fitting is attached to an aircraft service bulkhead coupling. The fitting consists of two parts, one attached to the supply hose and the other attachable to the bulkhead coupling. The fitting parts are maintained in a sealed assembly relationship by a frangible connector having two separate frangible sections. One frangible section fracturing and releasing the fitting parts under excessive bending forces while the other frangible structure releases upon excessive tension forces being imposed upon the fitting.

13 Claims, 4 Drawing Sheets

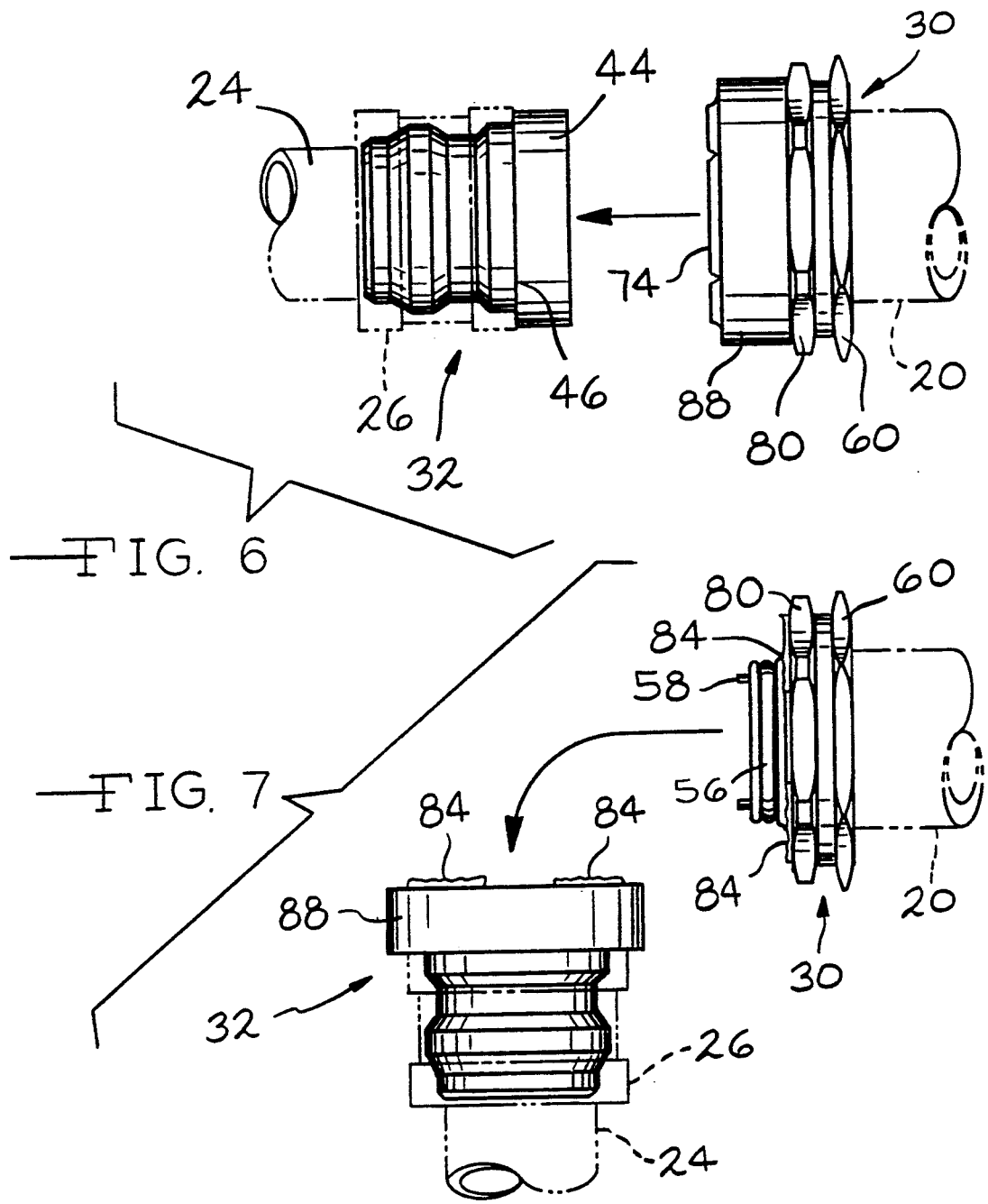

FRANGIBLE FITTING ASSEMBLY

BACKGROUND OF THE INVENTION

Aircraft are often serviced by vehicles supplying fuel, oil, water or the like wherein the fluid is pumped through a flexible hose connected to the fluid source carried by the truck. The end of the hose includes a fitting adapted to be attached to a complementary coupling mounted upon the aircraft, such as upon a service bulkhead. The fitting is provided with connection structure, often of a quick release type, wherein the fitting may be quickly attached to the aircraft mounted coupling in a fluidtight manner.

Should the vehicle operator forget to disconnect the hose fitting from the aircraft coupling prior to moving the vehicle the resultant hose tensioning will cause fracturing of a component of the servicing system and may result in significant aircraft damage requiring time consuming repair and expensive down time.

It is known with couplings and fittings, including those often used with aircraft, to provide the coupling or fitting with frangible or weakened structure capable of fracturing prior to damaging forces being imposed upon the aircraft associated components. Frangible couplings are typified in the disclosures of the assignee's U.S. Pat. Nos. 4,884,591 and 4,971,096.

SUMMARY OF THE INVENTION

It is an object of the invention to provide an economical and dependable frangible conduit fitting capable of preventing either excessive bending or tension forces from being transmitted through a conduit system utilizing the fitting.

Another object of the invention is to provide a frangible conduit fitting for use with flexible hose wherein the fitting is of a concise economical configuration and the frangible component is protected against inadvertent exterior damage.

An additional object of the invention is to provide a frangible fitting for use with flexible hose wherein the fitting utilizes two distinct frangible portions, respectively configured to operate under excessive bending or tension forces.

A further object of the invention is to provide a frangible conduit fitting utilizing aligned and sealed metal parts wherein a frangible connector formed of a synthetic plastic material maintains the operative interrelationship of the metal fitting parts under normal operating conditions.

A fitting in accord with the invention consists of first and second tubular parts, the first part being connectible to a hose and the second part being attachable to a coupling, such as mounted on an aircraft bulkhead. The parts inter-engage in a fluid tight relationship and employ inter-mating components to prevent relative rotation about the fitting axis and for maintaining a coaxial relationship between the parts. Conduit connection means are defined on each of the parts, for instance, the first part may be internally threaded for attachment to the end of a vehicle supply hose, while the second part normally includes conduit connection means for attachment to an aircraft service bulkhead coupling.

An annular frangible connector maintains the assembly of the two fitting parts. The connector is internally threaded for association with threads defined upon the first part, and the connector is also provided with an inwardly radially extending frangible lip axially spaced from its threads which is located in an axial interfering relationship with a shoulder defined upon the second part whereby the lip will fracture upon excessive tension forces being applied to the fitting.

A plurality of circumferentially extending slots pass through the material of the connector intermediate the connector threads and lip, and axial extending frangible ribs are located intermediate the slots. In this manner the slots weaken the connector wall, and the ribs constitute frangible connector wall portions adapted to fracture and release the fitting parts under excessive bending forces.

The connector includes an interior cylindrical surface engaging a complementary cylindrical surface defined upon the fitting second part wherein the engaging cylindrical surfaces orient the connector to the fitting and restrain the connector against bending forces transversely disposed to the fitting axis.

Preferably, the fitting parts are formed of metal, while the connector body is formed of a synthetic plastic material substantially weaker than the material of the fitting parts. The weaker material of the connector assures fracturing of the connector and release of the fitting parts prior to damage being inflicted upon the aircraft in the event of excessive bending or tension forces being applied to the fitting, and to insure the proper fracturing characteristics of the connector a stainless steel band circumscribes the connector in radial alignment with the cylindrical surfaces. The band exteriorly bridges the slots and ribs and reinforces the synthetic plastic connector to assure operation within its predetermined fracturing ranges. A retainer is interposed between the connector and the band to maintain the band properly oriented upon the connector.

BRIEF DESCRIPTION OF THE DRAWINGS

The aforementioned objects and advantages of the invention will be appreciated from the following description and accompanying drawings wherein:

FIG. 6 illustrates release of the fitting parts and fracturing of the connector lip upon excessive tension forces being applied to the fitting parts, and FIG. 7 illustrates the release of the fitting parts and fracturing of the connector ribs under excessive bending forces.

DESCRIPTION OF THE PREFERRED EMBODIMENT

Figure 1:
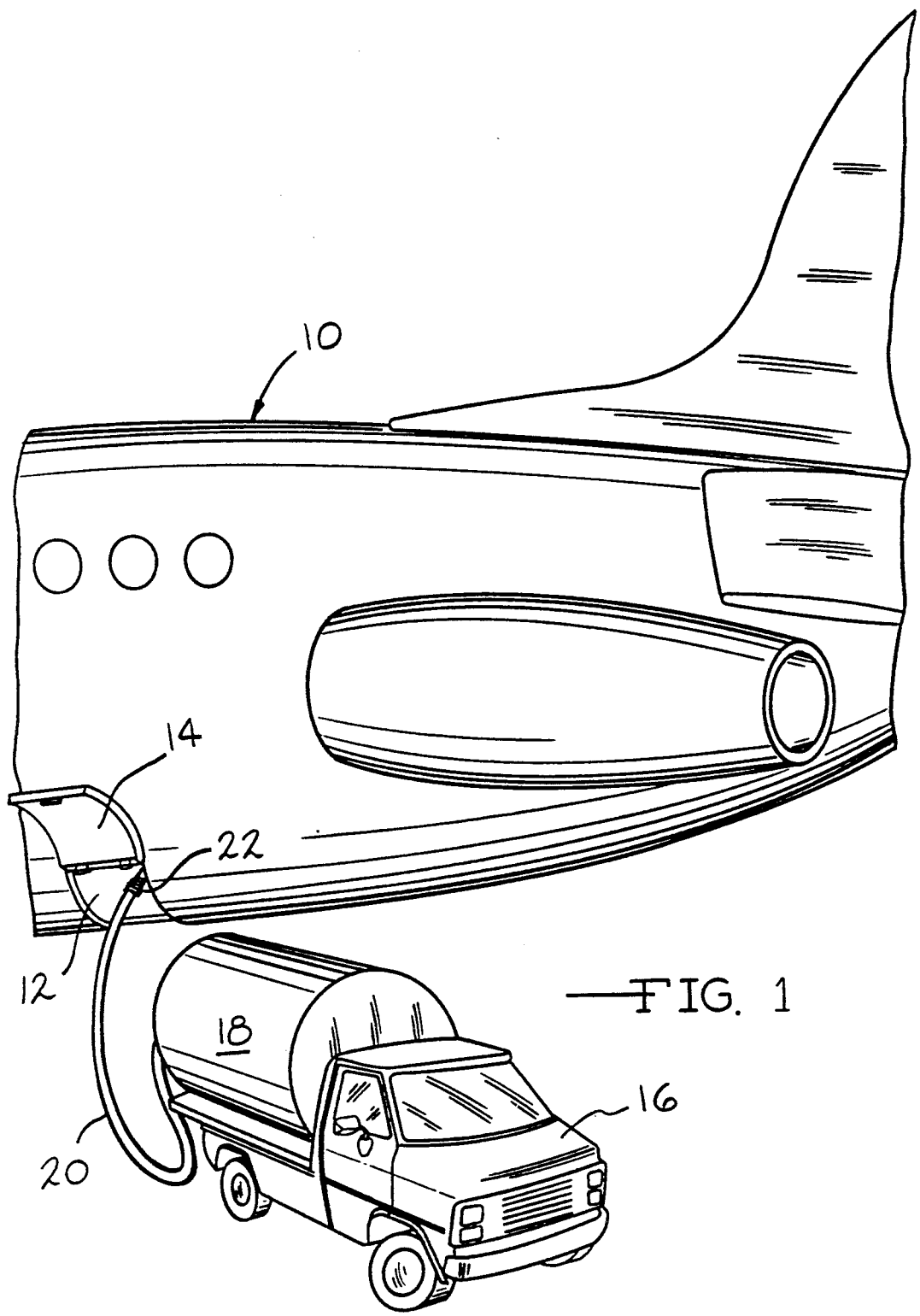
FIG. 1 is a perspective view of an aircraft being serviced by a vehicle utilizing a frangible fitting in accord with the invention.
Figure 2:
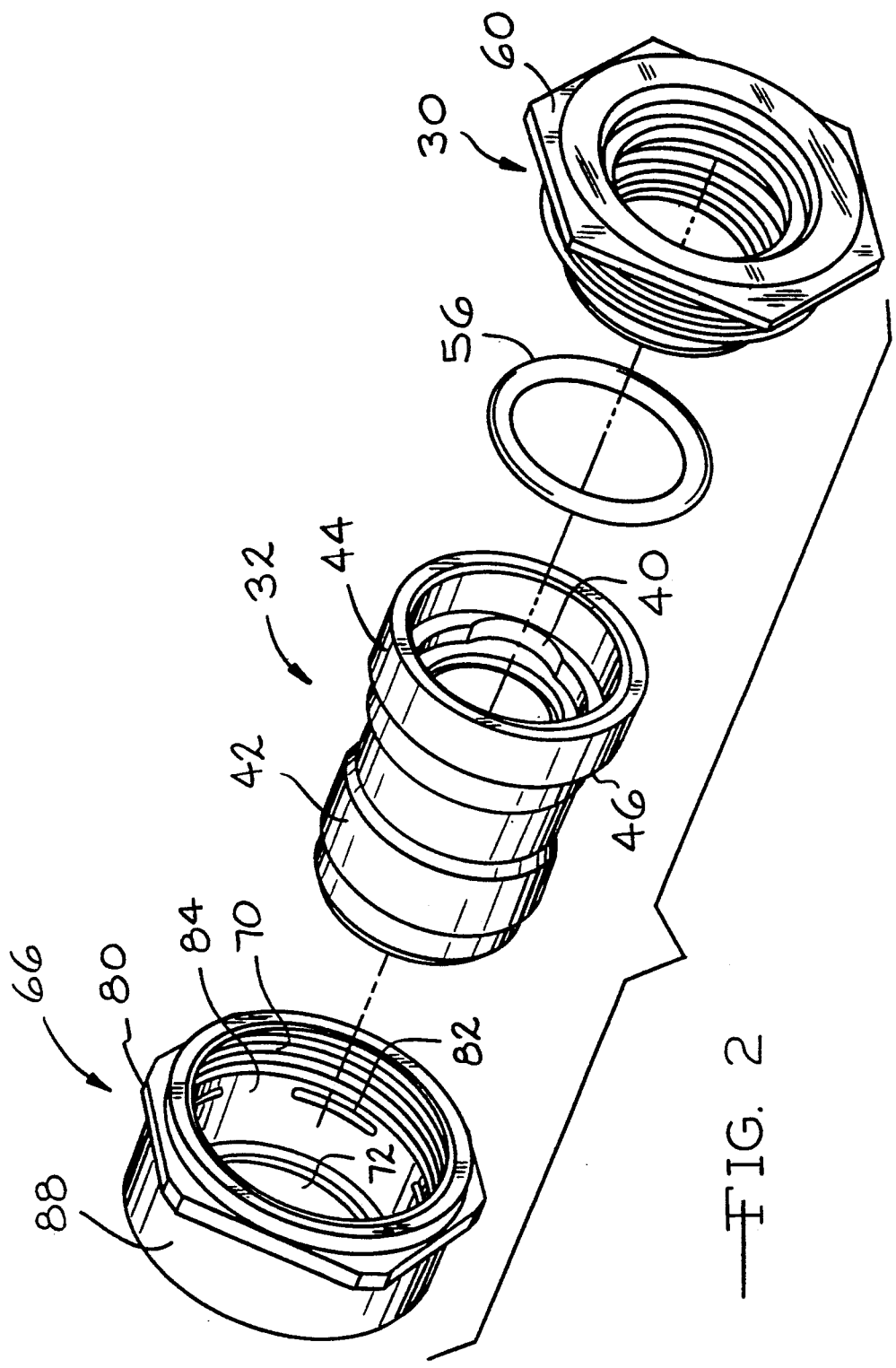
FIG. 2 is an exploded perspective view of the components of a frangible fitting utilizing the inventive concepts.

While it is to be appreciated that use of a frangible fitting in accord with the inventive concepts is not limited to aircraft servicing applications such usage is typical and utilizes the advantages of the invention to the fullest, and in FIG. 1 a typical aircraft servicing situation is illustrated.

The aircraft 10 includes a recessed service bulkhead 12 accessible through the access door 14. The service vehicle may take the form of a truck 16 having a tank 18 mounted thereon containing the fluid to be supplied to the aircraft 10, such as lavatory water. A flexible hose 20 communicates with the tank 18, or a pump, not shown, being supplied by the tank, and the end of the hose 20 is provided with the frangible fitting 22 constituting the subject matter of the invention.

The service bulkhead 12 will have a coupling or bulkhead conduit 24, FIGS. 6 and 7, mounted thereon, and the bulkhead coupling may employ an axially displaceable quick release sleeve 26, FIGS. 6 and 7, permitting the fitting 22 to be attached or removed from the bulkhead coupling 24 in the known manner. Frangible fitting 22 consists of the hose part 30 to which the hose 20 is attached, and the bulkhead part 32 selectively attachable to the bulkhead coupling 24.

The part 32 includes a cylindrical concentric flow passage 34 having an enlarged diameter 36 adjacent its radial inner end 38. Axially extending recesses 40 are defined in the passage 34 by radial shoulders for a reason later described.

An annular detent shoulder 42 is defined upon the exterior of the part 32 for cooperation with the releasable detents, not shown, operated by the bulkhead coupling release sleeve 26. Also, the part 32 includes an exterior cylindrical surface 44 adjacent the radial shoulder 46.

The hose part 30 includes a passage 48 having threads 50 defined therein for attachment to threads formed on a fitting, not shown, permanently attached to the end of the hose 20, and in this manner the part 30 is attached to the hose 20 in a fluid tight manner.

Figure 4:
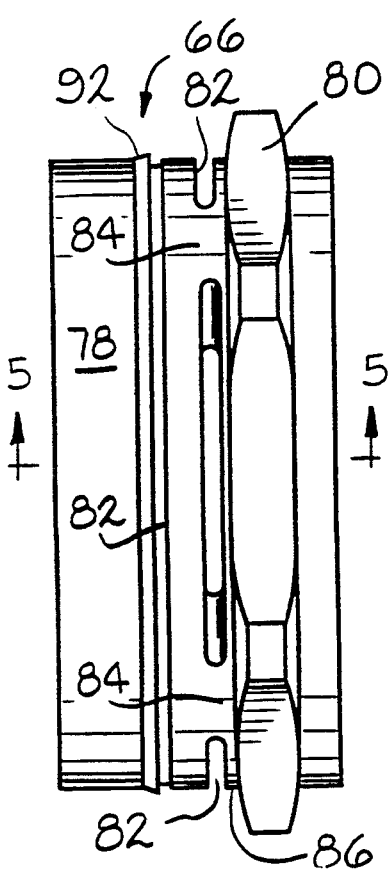
FIG. 4 is an elevational view of the frangible connector, per se.

The part 30 includes a nose 52 which extends into the bulkhead part diameter 36, and the nose includes a groove 54 for receiving the elastomeric O-ring 56 which engages and seals with the diameter 36 as appreciated from FIG. 4.

The hose part nose 52 also includes axially extending ears 58 which are received within the recesses 40, and as the ears 58 are in an interfering relationship with the radial shoulders of the recesses 40, the interrelationship between the ears and recesses limits relative rotational displacement between the fitting body parts 30 and 32.

Exteriorly, the part 30 is provided with a radially extending flange 60 having flats formed thereon for receiving a wrench and an exterior thread 62 is defined on the part 30 in axial spaced relationship to the flange 60. A radial shoulder 64 is defined on the part 30 for abutting against the end 38 of the bulkhead part 32.

Figure 3:
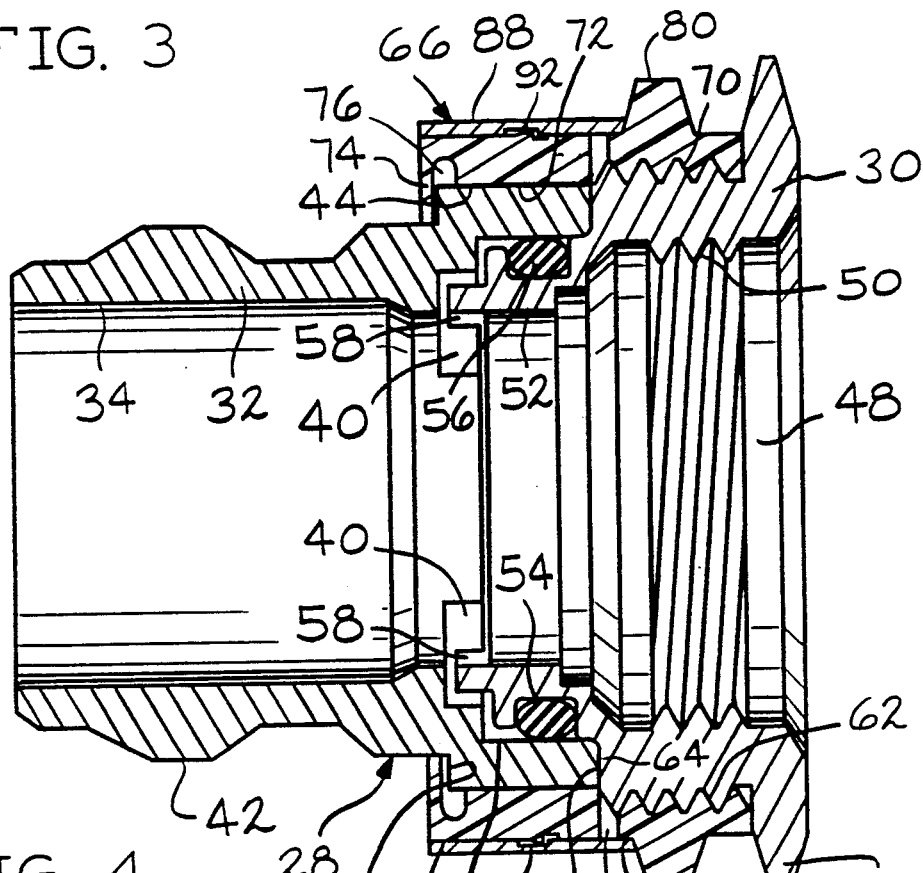
FIG. 3 is a diametrical elevational sectional view of the frangible fitting.

The frangible connector for the fitting parts is generally indicated at 66 and is of an annular configuration, FIGS. 3 and 4, internally including a bore 68. The bore 68 includes internal threads 70 adjacent the right end of the connector 66, and at its left region, FIGS. 3–5, the connector bore is provided with a cylindrical surface 72. An inwardly radially extending lip 74 is homogeneously defined from the synthetic plastic material defining the connector 66, and the connector material is formed with an undercut relief at 76 in order to accurately regulate the fracturing pressures required at the lip 74.

Exteriorly, the connector 66 is provided with a cylindrical surface 78 in radial aligned relationship to the inner cylindrical surface 72 and a flange is defined upon the connector 66 having flats 80 formed thereon for cooperation with a wrench.

Circumferentially extending slots 82 are formed in the body of the connector 66 extending through the wall thickness thereof. The slots 82 terminate short of circumferential intersection with each other to define a plurality of axially extending frangible ribs 84 which are in axial alignment with the slots 82.

A small cylindrical shoulder 86 is defined upon the exterior of the connector 66 intermediate the slots 82 and the wrench flat flange and the diameter of the shoulder 86 is equal to the diameter of the exterior cylindrical surface 78 constituting an extension thereof.

A stainless steel annular band 88 circumscribes the connector 66 and firmly engages the cylindrical surface 78. The band 88 is of sufficient length to bridge the slots 82 and ribs 84 and will engage the shoulder 86 as well as the surface 78 as appreciated from FIG. 3.

Figure 5:
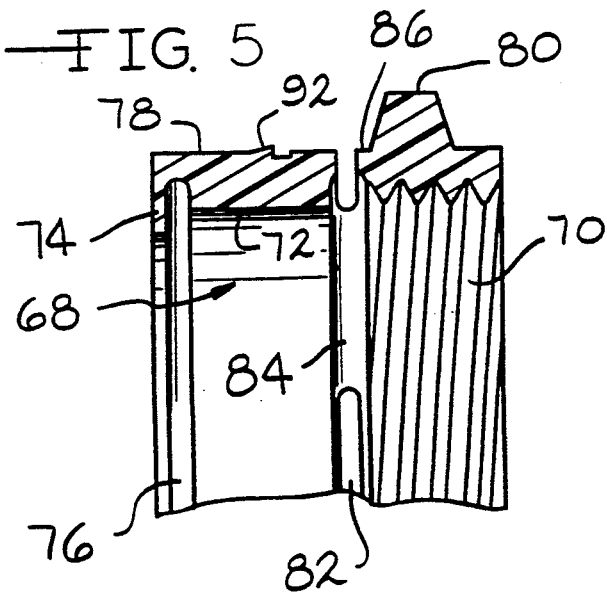
FIG. 5 is an enlarged sectional view through the connector as taken along Section 5—5 of FIG. 4.

Internally, the band 88 is provided with a groove 90, and an oblique rib 92, FIG. 5, is defined on the surface 78 for reception within the band groove 90 for preventing relative axial displacement between the connector 66 and the band 88 upon the surface 78.

The fitting 22 is assembled in the manner as will be appreciated from FIG. 3. The nose 52 of part 30 is received within the enlarged diameter 36 of the part 32 wherein the seal 56 will establish a sealed fluid-tight interrelationship between the parts. As the ears 58 will be received within the recesses 40 relative rotational movement between parts 30 and 32 will be prevented.

The interrelationship between the nose of the hose part 30 and the bulkhead part 32 enlarged diameter 36, as well as the engagement of the end 38 with the shoulder 64 constitutes orientation structure for assuring the proper alignment of the parts 30 and 32 for successful operation.

After the parts 30 and 32 are so assembled, the connector 66 is threaded upon the threads 62 and upon fully threading the connector 66 upon the hose part 30 the connector cylindrical surface 72 will be firmly engaging the cylindrical surface 44 of the bulkhead part 32. Accordingly, the components will now be assembled as shown in FIG. 3.

With the frangible fitting 22 assembled as in FIG. 3 the fitting may be threaded upon the hose fitting by threads 50 and the fitting 22 now becomes a part of the vehicle hose 20.

When it is desired to service the aircraft 10 the access door 14 will be opened and the fitting 22 will be connected to the bulkhead coupling 24 by the coupling quick release sleeve 26. Fluid may now flow through the hose 22 to supply the bulkhead coupling 24 for the purpose intended.

In proper operation, when it is desired to remove the hose 20 from the bulkhead coupling 24 the release sleeve 26 is axially displaced to permit the coupling 24 to release the fitting 22. However, in the event that the operator neglects to disconnect the fitting 22 from the bulkhead coupling 24 the frangible connector 66 will prevent damage from being inflicted upon the aircraft and the bulkhead coupling 24 due to tensioning of the hose 20 as the vehicle is driven away from the aircraft.

In the event that primarily axial forces are imposed upon the fitting 22, i.e. substantially parallel with the aligned axes of the parts 30 and 32, the connector lip 74 will engage the radial shoulder 46 of the bulkhead part 32, and this action will cause the lip 74 to fracture adjacent the undercut relief 76 and permit the parts 30 and 32 to separate as shown in FIG. 6.

In the event that primarily bending forces are applied to the fitting 22, i.e. wherein the forces imposed upon parts 30 and 32 are transversely disposed to the axes of the parts, the fact that the connector cylindrical surface 72 is firmly mounted upon the bulkhead part cylindrical surface 44 provides support of the connector transverse to the axis of the fitting 22, and bending forces transverse to the axis of the hose part 30 will impose high tension forces on the ribs 84 causing the ribs 84 to fracture and permit the parts 30 and 32 to separate as shown in FIG. 7.

From the above description, it will be appreciated that the frangible connector 66 maintains the fitting parts 30 and 32 in an operable relationship permitting normal use of the hose 20 and fitting 22. As the parts 30 and 32 will normally be formed of metal, and as the connector 66 is formed of a synthetic plastic material such as ABS plastic, the weaker physical characteristics of the connector 66 provide an effective safety aspect to the fitting. However, because of the weaker strength of the connector 66 the connector might be too prone to fracture under normal usage, and the presence of the band 66 reinforces the connector 66 against premature fracturing of the ribs 84. Further, the band 88 will protect the plastic material of the connector from exterior damage and abrasion.

It is appreciated that various modifications to the inventive concepts may be apparent to those skilled in the art without departing from the spirit and scope of the invention.

We claim:

1. A frangible conduit fitting assembly comprising, in combination, a body having first and second tubular parts each having a longitudinal axis and conduit connector means, each of said parts having an axial flow passage defined therein, inter-engaging orientation means defined on said parts coaxially aligning said flow passages thereof to align said parts in an operative relationship, sealing means interposed between said parts establishing a fluid-tight interrelationship therebetween, a connector engaging and interconnecting said parts and maintaining said parts in said operative relationship, first frangible means defined on said connector adapted to fracture upon predetermined bending forces being relatively imposed on said parts transversely to said parts' axes releasing said parts from each other comprising circumferential extending slots defined in said connector and axially extending ribs circumferentially located intermediate and axially aligned with said slots, and second frangible means defined on said connector adapted to fracture upon predetermined axial tension forces being relatively imposed on said parts releasing said parts from each other, said second frangible means comprising first and second radially extending axially spaced shoulders defined of said connector, a third radial shoulder defined on said first part engageable by said first shoulder under tension forces and a fourth radial shoulder defined on said second part engageable by said second shoulder under tension forces, said second shoulder adapted to fracture upon said predetermined tension forces being applied to said parts, said first and third radial shoulders comprising mating threads formed on said connector and said first part.

2. In a frangible conduit fitting assembly as in claim 1, said connector being formed of synthetic plastic, and a reinforcing bridge axially extending over said slots and ribs reinforcing said connector first frangible means against fracture under bending forces.

3. In a frangible conduit fitting assembly as in claim 2, an exterior cylindrical surface defined on said connector, said slots intersecting said cylindrical surface, said reinforcing bridge comprising an annular band firmly encircling said surface and axially extending over said slots and ribs.

4. In a frangible conduit fitting assembly as in claim 3, retainer means interposed between said connector and said band preventing relative axial displacement therebetween.

5. In a frangible conduit fitting assembly as in claim 1, said second shoulder comprising a thin wall radially extending lip defined on said connector, said fourth shoulder axially facing away from said first part and toward said lip.

6. A frangible conduit fitting assembly comprising, in combination, a body having first and second tubular parts each having a longitudinal axis and conduit connector means, each of said parts having an axial flow passage defined therein, interengaging orientation means defined on said parts coaxially aligning said flow passages thereof to align said parts in an operative relationship, sealing means interposed between said parts establishing a fluid-tight interrelationship therebetween, first threads exteriorly defined on said first part substantially concentric to said flow passage thereof, a cylindrical exterior surface defined on said second part substantially concentric to said flow passage thereof, an annular connector circumscribing portions of said first and second parts, said connector having an axial bore having second threads defined therein mating with said first part first threads and a cylindrical surface axially spaced from said second threads firmly engaging said second part exterior cylindrical surface, first frangible means defined on said connector adapted to fracture upon predetermined bending forces being relatively imposed upon said parts transversely to said parts' axes releasing said parts from each other, and second frangible means interposed between said connector and said second part adapted to fracture upon predetermined axial tension forces being relatively imposed on said parts releasing said parts from each other.

7. In a frangible conduit fitting assembly as in claim 6, said first frangible means comprising circumferential extending slots defined in said connector and axially extending ribs circumferentially located intermediate and axially aligned with said slots.

8. In a frangible conduit fitting assembly as in claim 7, said slots and ribs being axially located intermediate said connector's threads and cylindrical surface.

9. In a frangible conduit fitting assembly as in claim 6, said second frangible means comprising a radially extending frangible lip defined on said connector, a radial shoulder defined on said second part axially facing away from said first part, said lip being in axial alignment with and adjacent said shoulder.

10. A frangible connector for interconnecting two separable parts of a fluid fitting comprising, in combination, an annular body having an axial bore, first and second ends, and an exterior surface, threads defined in said bore adjacent said first end, a frangible lip defined on said body adjacent said second end extending radially inward of said bore, and a plurality of circumferentially extending slots radially extending through said body defining frangible circumferentially spaced ribs therebetween, said slots and ribs being axially located between said threads and said lip.

11. In a frangible connector as in claim 10, a cylindrical axially extending bore surface defined in said bore adjacent said lip axially located between said lip and said slots and ribs.

12. In a frangible connector as in claim 11, an outer cylindrical surface defined on said body exterior surface concentric to and radially aligned with said bore surface, and a reinforcing band firmly engaging and circumscribing said outer surface and axially bridging said slots and ribs.

13. In a frangible connector as in claim 12, band restraining means defined on said outer surface and engaging said band restraining said band against axial displacement on said outer surface.

* * * * *